(12) United States Patent
An et al.

(10) Patent No.: US 8,993,147 B2
(45) Date of Patent: Mar. 31, 2015

(54) BATTERY PACK

(75) Inventors: Jin-Hong An, Suwon-si (KR); No-Hyun Kwag, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 342 days.

(21) Appl. No.: 12/768,103

(22) Filed: Apr. 27, 2010

(65) Prior Publication Data

US 2011/0135993 A1  Jun. 9, 2011

(30) Foreign Application Priority Data

Dec. 4, 2009 (KR) .................. 10-2009-0119901

(51) Int. Cl.
| | |
|---|---|
| *H01M 6/42* | (2006.01) |
| *H01M 6/46* | (2006.01) |
| *H01M 2/02* | (2006.01) |
| *H01M 2/10* | (2006.01) |
| *H01M 6/44* | (2006.01) |
| *H01M 10/613* | (2014.01) |
| *H01M 10/643* | (2014.01) |
| *H01M 10/6551* | (2014.01) |
| *H01M 10/6557* | (2014.01) |

(52) U.S. Cl.
CPC .............. *H01M 2/1077* (2013.01); *H01M 6/44* (2013.01); *H01M 10/5004* (2013.01); *H01M 10/503* (2013.01); *H01M 10/5046* (2013.01); *H01M 10/5059* (2013.01)
USPC ........................... 429/156; 429/153; 429/177

(58) Field of Classification Search
None
See application file for complete search history.

(56) References Cited

U.S. PATENT DOCUMENTS

| 5,942,353 A | * | 8/1999 | Schoultz ................. 429/149 |
| 2001/0046624 A1 | * | 11/2001 | Goto et al. .............. 429/99 |
| 2010/0119926 A1 | * | 5/2010 | Gaben et al. ............ 429/120 |
| 2010/0255355 A1 | * | 10/2010 | Park et al. .............. 429/91 |

FOREIGN PATENT DOCUMENTS

| JP | 2008-047325 | 2/2008 |
| JP | 2008-251262 | 10/2008 |
| JP | 2008-251470 | 10/2008 |
| JP | 2008-277243 A | 11/2008 |
| WO | WO 2008038916 A1 * | 4/2008 |

OTHER PUBLICATIONS

Korean Office Action dated Apr. 26, 2011 in corresponding Application No. 10-2009-0119901.

* cited by examiner

*Primary Examiner* — Barbara Gilliam
*Assistant Examiner* — Adam A Arciero
(74) *Attorney, Agent, or Firm* — Knobbe Martens Olson & Bear LLP

(57) ABSTRACT

A battery pack including a plurality of battery cells and having improved battery lifetime. The battery pack includes a holder case defining a plurality of cell spaces; and a plurality of battery cells are accommodated in a pattern in a portion of the plurality of cell spaces, wherein some of the plurality of cell spaces are empty.

19 Claims, 6 Drawing Sheets

BATTERY PACK

CROSS-REFERENCE TO RELATED APPLICATION

This application claims the benefit of Korean Patent Application No. 10-2009-0119901, filed on Dec. 4, 2009, in the Korean Intellectual Property Office, the disclosure of which is incorporated herein by reference.

BACKGROUND

1. Field

One or more embodiments of the present invention relate to a battery pack, and more particularly, to a battery pack that improves efficiency by electrically connecting a plurality of unit batteries and packing the electrically connected unit batteries as one unit.

2. Description of the Related Art

As mobile device technology has remarkably developed and the demand for mobile devices has increased, the demand for secondary batteries as a power supply source has also rapidly increased. Depending on the types of external devices in which batteries are used, such secondary batteries may be used in the form of a single battery or in the form of a battery pack in which a plurality of batteries are electrically connected and are packed as one unit.

Small-sized devices such as mobile phones operate with an output and capacity of a single battery for a predetermined amount of time. On the other hand, battery packs are usually used in medium or large size devices such as mobile devices including notebook computers or camcorders, motor-operated bicycles requiring high power, motor scooters, electric motor vehicles, and hybrid electric motor vehicles that need to be driven with high power for a long time.

Thus, these medium or large size devices require higher output power and higher capacity batteries. Battery packs are capable of increasing an output voltage or an output current according to the number and connection structure of batteries embedded in the battery packs. In such battery packs, a plurality of batteries are embedded therein, and a charge and/or discharge operation is performed using large amounts of current. Thus, a plurality of battery cells included in battery packs may overheat.

SUMMARY

One or more embodiments of the present invention include a battery pack including a plurality of battery cells capable of increasing battery lifetime.

Additional aspects will be set forth in part in the description which follows and, in part, will be apparent from the description, or may be learned by practice of the presented embodiments.

According to one or more embodiments of the present invention, a battery pack including a holder case for defining a plurality of cell spaces; and a plurality of battery cells accommodated in the plurality of cell spaces, respectively, wherein the plurality of battery cells are not accommodated in at least one of the plurality of cell spaces.

According to another embodiment of the present invention, the plurality of battery cells may not be accommodated in at least one of the plurality of cell spaces surrounded by other cell spaces.

According to another embodiment of the present invention, the plurality of cell spaces may be arranged in a first direction inside the holder case, and arranged in a second direction that is different from the first direction.

According to another embodiment of the present invention, the second direction may be substantially perpendicular to the first direction.

According to another embodiment of the present invention, the battery pack may further include: a plurality of first groups each comprising the plurality of cell spaces arranged in N columns in the first direction and in N rows in the second direction, wherein at least one of the plurality of cell spaces is an empty cell space, excluding the cell spaces of the plurality of first groups formed between a 1st row and an Nth row of an Nth column (where N is a natural number).

According to another embodiment of the present invention, the empty cell space may be formed between two or more neighboring cell spaces.

According to another embodiment of the present invention, at least one of the plurality of first groups may be arranged in the first direction.

According to another embodiment of the present invention, the battery pack may further include: a second group comprising the plurality of cell spaces arranged in M columns in the first direction and in N rows in the second direction, wherein the plurality of battery cells is accommodated in all the cell spaces of the second group.

According to another embodiment of the present invention, at least one of the plurality of first groups may be consecutively arranged in the first direction, and at least one of the second group may be consecutively arranged in the first direction from the last first group.

According to another embodiment of the present invention, all the cell spaces may be empty cell spaces, excluding the cell spaces formed between a 1st row and an Nth row of an Nth column of each of the first groups.

According to another embodiment of the present invention, the cell spaces formed between a 2nd row and an N−1th row of the Nth column of each of the first groups may be a single space.

According to another embodiment of the present invention, the empty cell spaces may have different shapes from the cell spaces in which the plurality of battery cells are accommodated.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
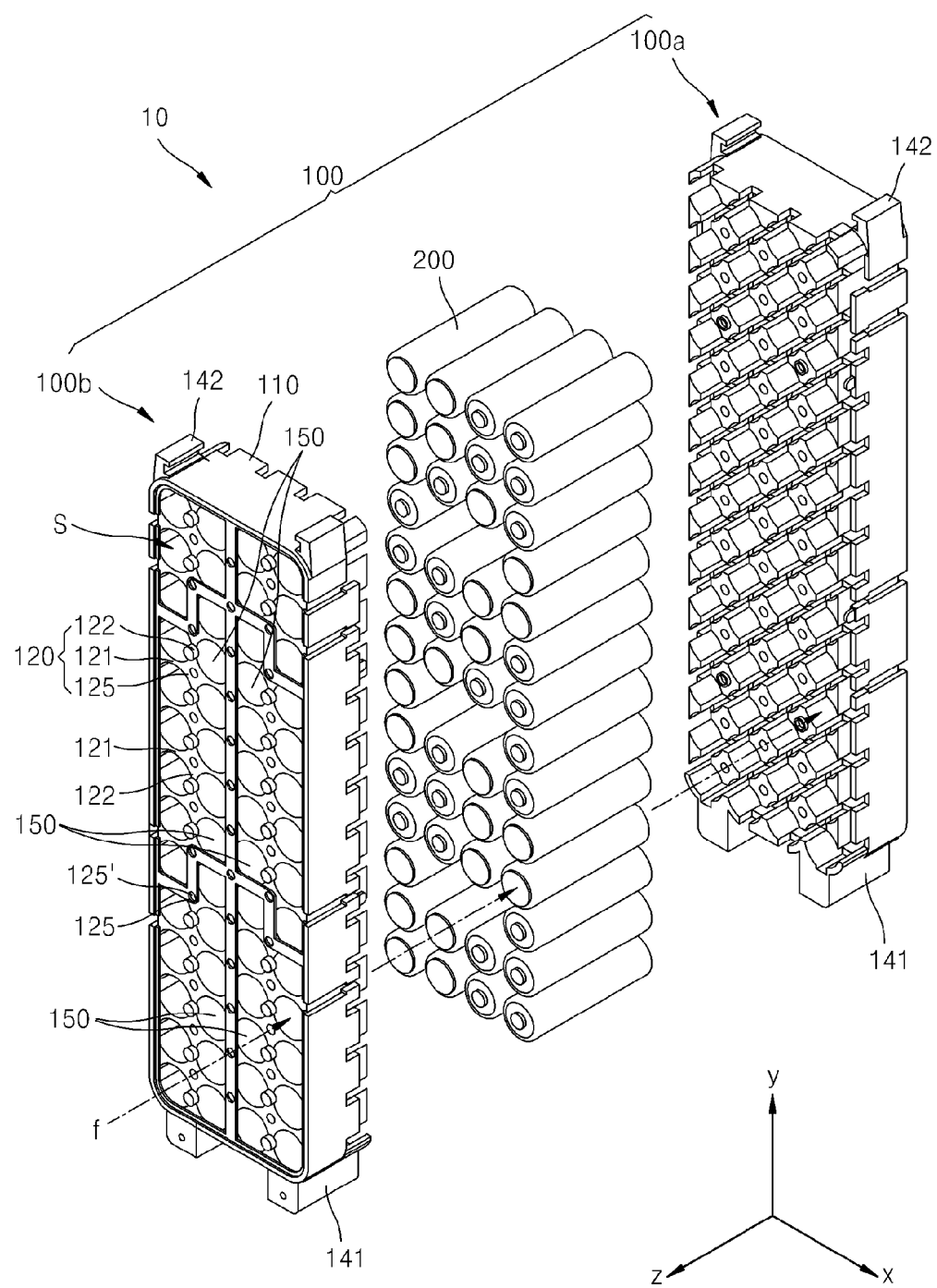
FIG. 1 is an exploded perspective view of a battery pack according to an embodiment of the present invention.

Reference will now be made in detail to the present embodiments of the present invention, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

FIG. 1 is an exploded perspective view of a battery pack 10 according to an embodiment of the present invention.

Referring to FIG. 1, the battery pack 10 may include a holder case 100 and a plurality of battery cells 200. The holder case 100 accommodates the battery cells 200 therein and packs the battery cells 200 as one unit. The battery cells 200 are accommodated in the holder case 100.

The battery pack 10 has a structure in which the battery cells 200 are packed, so that heat generated from the battery cells 200 is efficiently dissipated. Accordingly, a temperature of the battery cells 200 is reduced, thereby increasing the lifetime of the battery pack 10.

The holder case 100 may include a first holder case 100a and a second holder case 100b that face each other. A plurality of cell spaces S are formed between the first holder case 100a and the second holder case 100b of the holder case 100. The battery cells 200 may be accommodated in the cell spaces S formed in the holder case 100.

The cell spaces S include empty cell spaces 150 in which the battery cells 200 are not accommodated. An air flow is induced through the empty cell spaces 150, so as to improve heat dissipation efficiency of the battery pack 10.

Further, all the cell spaces S of a column or a row are not the empty cell spaces 150. Some of the cell spaces S, for example, inner cell spaces, may be the empty cell spaces 150, thereby improving the spatial efficiency of the holder case 100 in which the battery cells 200 are accommodated.

The shape of the first and second holder cases 100a and 100b may be symmetrical, and the first and second holder cases 100a and 100b may form a pair. The first holder case 100a may be combined with the second holder case 100b in a z-direction, in such a manner that the battery cells 200 are accommodated inside the holder case 100.

Throughout the present specification, an inner surface of the holder case 100 is referred to as a surface that the first holder case 100a and the second holder case 100b both face, and an outer surface of the holder case 100 is referred to as a surface that is opposite the surface that the first holder case 100a and the second holder case 100b face.

The portions of the first and second holder cases 100a and 100b, which accommodate the battery cells 200, may be symmetrical with each other, but combination portions of the first and second holder cases 100a and 100b may also have complementary members, so that they may be engaged with one another.

Each of the first and second holder cases 100a and 100b may include a holder frame 110 and a plurality of ribs 120. Each holder frame 110 forms an outline of each of the holder cases 100a and 100b, respectively. The ribs 120 are integrally formed with the holder frames 110 and separate the battery cells 200 from one another. The holder frames 110 encompass the lateral surfaces of the ribs 120 so that the holder frames 110 and the ribs 120 integrally form the outline of the holder case 100.

The ribs 120 define the cell spaces S in which each of the battery cells 200 is accommodated so that the battery cells 200 embedded in the battery pack 10 may be arranged in a plurality of columns at regular intervals. Each cell space S may have a form of a hole that is disposed inside the holder case 100. For example, the ribs 120 may provide cylindrical support surfaces so as to encompass the circumferences of cylindrical type battery cells 200.

Each of the ribs 120 may include a first fin 121, a second fin 122, and a column 125. The first fin 121 may extend in an x-axis direction in order to separate the battery cells 200 arranged in the y-axis direction.

The second fin 122 may extend in the y-axis direction in order to separate the battery cells 200 arranged in the x-axis direction. The column 125 may be disposed in a portion where the first fin 121 and the second fin 122 cross each other.

A heat dissipation hole 125', for forming an air path, is formed along the extension direction of each column 125 in each of the ribs 120. For example, each heat dissipation hole 125' has a circular cross-sectional shape and perforates each column 125 throughout its overall length. In this regard, an air flow f may be formed through the heat dissipation hole 125'.

The air flow f in the heat dissipation hole 125' proceeds in spaces between the neighboring battery cells 200, and heat generated during a charge and/or discharge operation is dissipated by the air flow f in the heat dissipation hole 125'.

The air flow f induced in the heat dissipation hole 125' may be generated naturally or may be initiated by an external movement of air. That is, the air flow f may allow heat dissipation to be performed by natural or forced convection. For example, a cooling fan (not shown) that provides cooling air to the heat dissipation hole 125' may be disposed outside the holder case 100.

The first fin 121 extends in the x-axis direction so that neighboring columns 125 arranged in the x-axis direction may be connected to each other. The second fin 122 extends in the y-axis direction so that neighboring columns 125 arranged in the y-axis direction may be connected to each other. Accordingly, neighboring columns 125 are supported via the first and second fins 121 and 122.

As the columns 125 are connected to each other via the first and second fins 121 and 122, the cylindrical cell space S that supports the circumference of each of the battery cells 200 may be defined. Accordingly, contact between neighboring battery cells 200 may be prevented.

Further, consecutive heating of the neighboring battery cells 200 may be prevented even in an abnormal operating environment in which a certain battery cell 200 is overheated. For example, the holder case 100 may be formed as a single body and may be formed of plastic having an excellent processing property and excellent insulation performance.

The columns 125 are connected to one another via the first and second fins 121 and 122 and thus ensure structural rigidity of the holder case 100. Further, inside the holder case 100, the columns 125 are separated from each other by the first and second fins 121 and 122 so that a portion of the surface of the battery cells 200 is directly exposed to the low temperature air.

Figure 2:
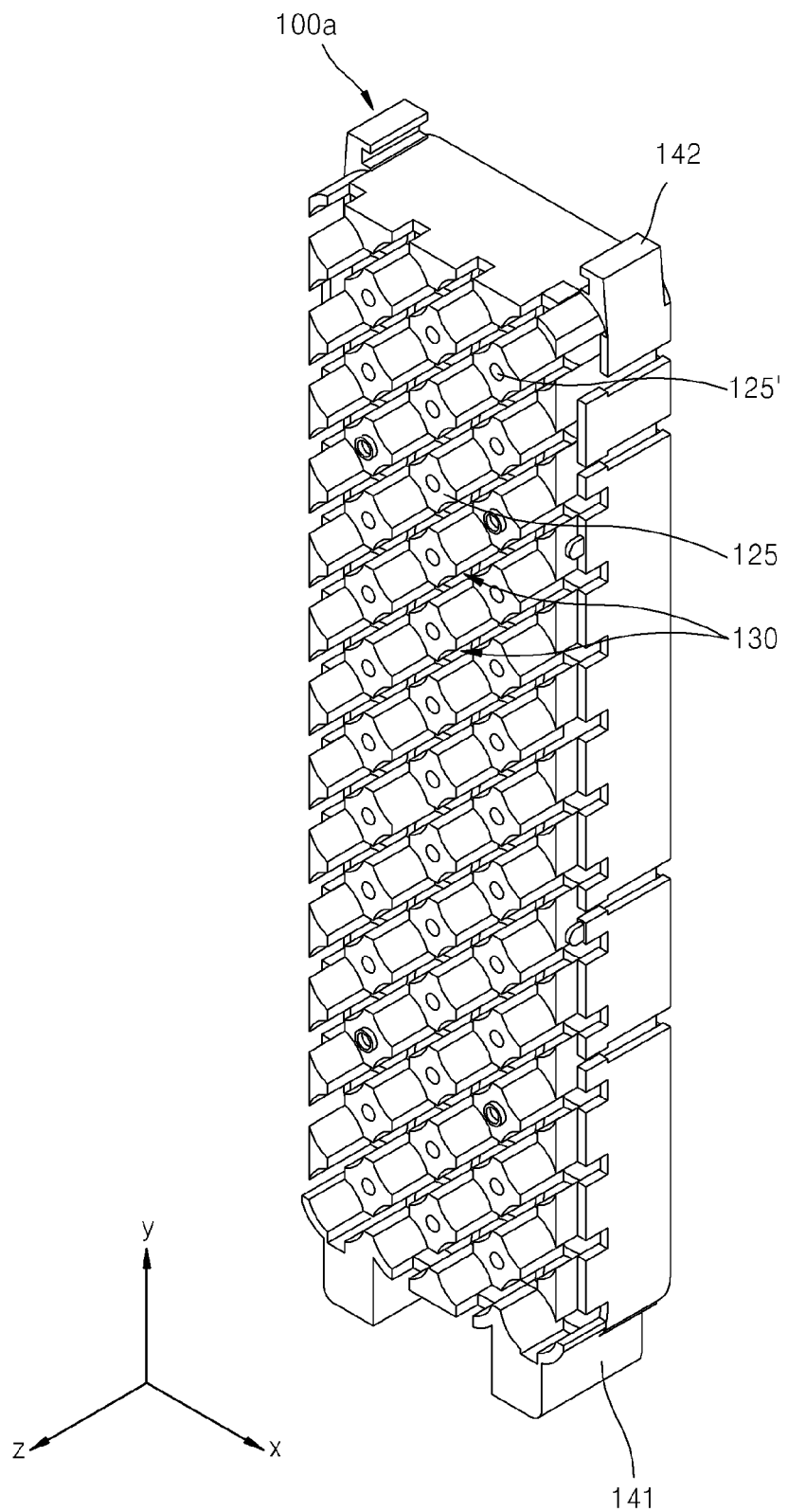
FIG. 2 is a perspective view of a holder case of the battery pack shown in FIG. 1.
Figure 3:
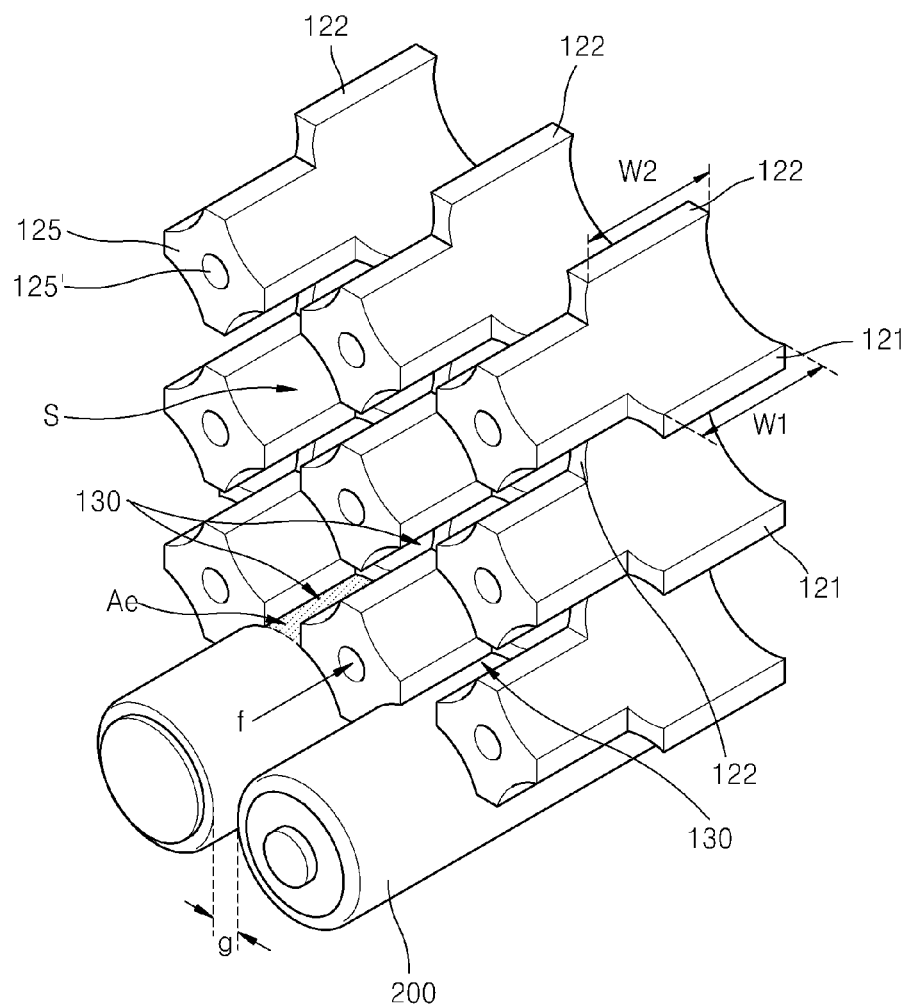
FIG. 3 is an enlarged perspective view of main portions of the holder case shown in FIG. 2.

FIG. 2 is a perspective view of the holder case 100 of the battery pack 10 of FIG. 1. FIG. 3 is an enlarged perspective view of main portions of the holder case 100 of FIG. 2.

Referring to FIGS. 2 and 3, the columns 125 are arranged in the x-axis and y-axis directions. A gap 130, through which the surface of the battery cells 200 is exposed, is formed between the columns 125. The gap 130 may be formed between portions of the columns on which the first and second fins 121 and 122 are not formed (refer to FIG. 3). These portions of the columns 125 are separated from one another by the gap 130 formed therebetween, and are isolated from each other.

A surface Ae of the battery cells 200 is exposed through the gap 130, and is directly exposed to the low temperature air. Accordingly, heat may dissipate by convection, and heat accumulation of the battery cells 200 during a charge and/or discharge operation may be prevented. The first and second fins 121 and 122 may extend in the z-axis direction to surround an end of the column 125, thus supporting the circumference of the battery cells 200. The first and second fins 121 and 122 extend in the z-axis direction into the inside of the holder case 100 by widths w1 and w2.

The widths w1 and w2 of the first and second fins 121 and 122 determine the size of the exposed area of the battery cells 200. In other words, as the widths w1 and w2 of the first and second fins 121 and 122 are increased, more surface of the battery cells 200 is covered by the first and second fins 121 and 122, and thus, the exposed surface Ae of the battery cells 200 is decreased. On the contrary, if the widths w1 and w2 of the first and second fins 121 and 122 are decreased, the gap 130 is increased due to the decreased widths w1 and w2 of the first and second fins 121 and 122, and thus, the exposed surface Ae of the battery cells 200 is increased.

By adjusting the widths w1 and w2 of the first and second fins 121 and 122, the exposed surface Ae of the battery cells 200 may be changed. As the exposed surface Ae of the battery cells 200 is increased, heat dissipation may be expedited. When the exposed surface Ae of the battery cells 200 is excessively increased, thermal contact between the neighboring battery cells 200 may occur, and the neighboring battery cells 200 may be consecutively heated and deteriorate in an abnormal operating environment in which the certain battery cell 200 is overheated. Thus, the exposed surface Ae of the battery cells 200 may be designed to an appropriate size.

A separation gap g between the battery cells 200 that are arranged in designated positions at regular intervals may be obtained. When the separation gap g is defined as the shortest distance from a curvature point to another curvature point between the neighboring battery cells 200, the separation gap g of at least 2 mm or more may be formed in view of heat dissipation efficiency.

The minimum separation gap g is formed in this way so that thermal contact between the neighboring battery cells 200 may be prevented, consecutive deterioration may be prevented, sufficient air flow in the separation gap g may be achieved, and heat dissipation may be expedited.

The heat dissipation holes 125' that form the air path f are formed along the extension direction of the columns 125. Four battery cells 200 are symmetrically disposed around each heat dissipation hole 125', and heat generated in each battery cell 200 arranged around the heat dissipation hole 125' is dissipated by the air flow f in the heat dissipation hole 125'.

Each cell space S, in which each battery cell 200 is accommodated, is defined by the four neighboring columns 125 in the x-axis and y-axis directions. For example, the lateral surface of the column 125 may be formed so as to encompass the cylindrical battery cells 200.

Each battery cell 200 to be accommodated in the holder case 100 may be a secondary battery that may be charged and/or discharged, such as a lithium ion secondary battery having excellent output and capacity. However, aspects of the present invention are not limited thereto, and various types of batteries, such as a nickel-cadmium secondary battery, a nickel-hydrogen secondary battery, a lithium battery, etc., may be used.

The battery cells 200 are charged or discharged with a large amount of current of 1000 mA or more, for example, 1800 mA. According to a heat dissipation structure that is suggested to prevent a temperature increase and deterioration or malfunction caused by a charge and/or discharge operation, heat generated in each battery cell 200 dissipates via the air flow f of the heat dissipation hole 125'. In this case, the exposed surface Ae of the battery cells 200 through the gap 130 formed between the columns 125 is directly exposed to the air so that heat dissipation may be expedited.

Figure 4:
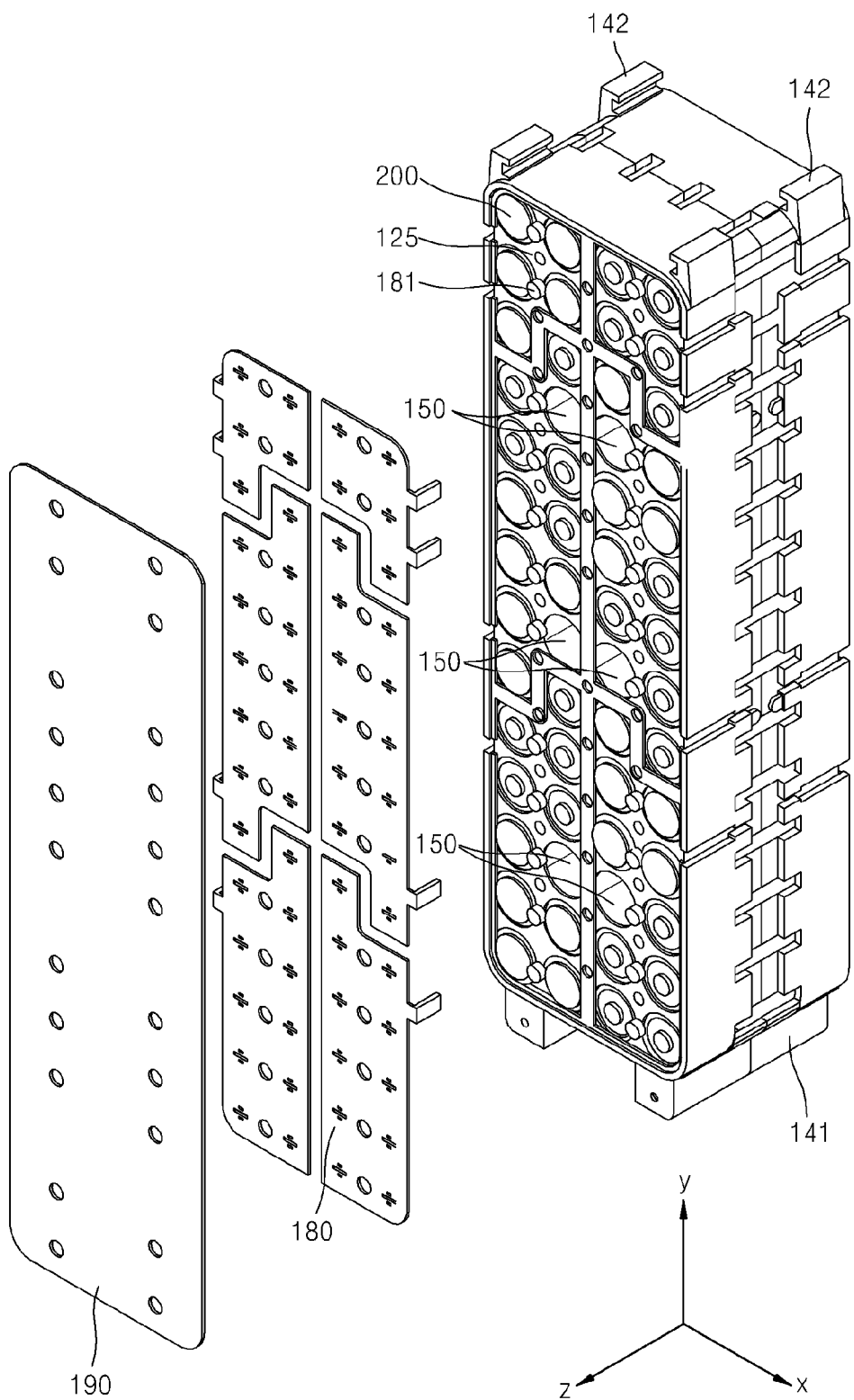
FIG. 4 is a perspective view of an assembled battery pack according to an embodiment of the present invention.

FIG. 4 is a perspective view of an assembled battery pack according to an embodiment of the present invention. Referring to FIG. 4, the first and second holder cases 100a and 100b are assembled to face each other to form the holder case 100 while the battery cells 200 are disposed therein. In this case, the battery cells 200 are disposed in positions of the cell spaces S defined in the holder case 100 at regular intervals.

A lead plate 180 is disposed on a front or back surface of the holder case 100 and electrically connects the battery cells 200 embedded in the battery pack in series and/or in parallel. The lead plate 180 may be accommodated in an assembly protrusion 181 that protrudes from the holder case 100. The assembly protrusion 181 may serve as a stopper that prevents the battery cells 200 accommodated in the holder case 100 from sliding out of the holder case 100.

The lead plate 180 connects electrodes of the battery cells 200 in series and/or in parallel. For example, the lead plate 180 may connect a group of five battery cells 200 arranged in rows and columns of an upper left block in parallel, may connect another group of five battery cells arranged next to the upper left block in parallel, and may connect these two groups of battery cells in series.

The connection structure of the battery cells 200 connected in series and/or in parallel or the number and arrangement of the battery cells 200 that constitute parallel blocks may be changed in various configurations. Also, the type of arrangement of the battery cells 200 that constitute the battery pack 10 is not limited to that described above.

An insulating tape 190 is attached to an outside of the lead plate 180 so that the lead plate 180 may be electrically insulated from an external environment. The battery pack 10 may include a circuit board (not shown) that detects the state of voltage of the battery cells 200 and controls a charge and/or discharge operation. The circuit board is electrically connected to the lead plate 180 that constitutes a current path, and may be connected to the lead plate 180 via a lead line (not shown) drawn out from the circuit board. The circuit board detects the state of voltage of each battery cell 200 and provides a charge current via the lead plate 180.

Meanwhile, leg members 141 and 142 that support the battery pack 10 in an upright position may be disposed at upper and lower ends of the holder case 100. For example, the leg members 141 and 142 may be disposed at the right and left sides of the holder case 100, and the battery pack 10 may be maintained in a stable upright position by the leg members 141 and 142 disposed in four symmetrical corners of the holder case 100.

Figure 5:
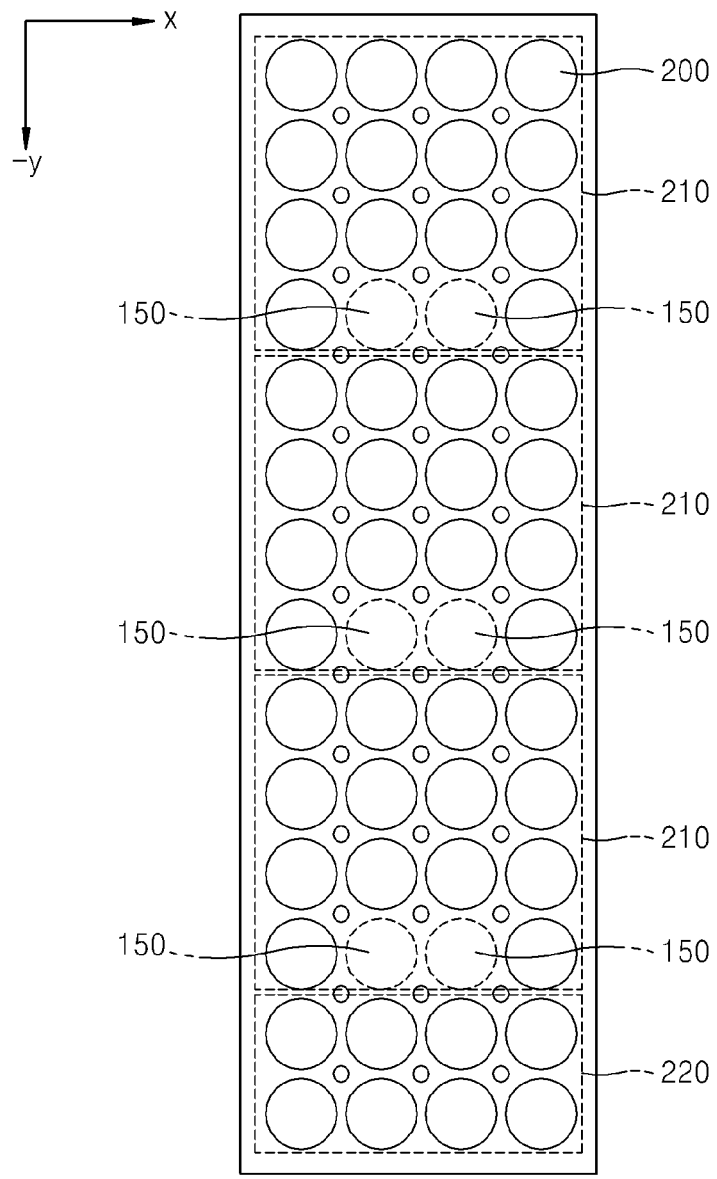
FIG. 5 is a schematic view of an arrangement of a plurality of battery cells included in the battery pack of FIG. 1, according to an embodiment of the present invention.

FIG. 5 is a schematic view of an arrangement of the battery cells 200 included in the battery pack 10 of FIG. 1, according to an embodiment of the present invention. Referring to FIG. 5, a 10S5P battery pack 10 is formed by connecting ten battery cells 200 in series and connecting five groups of ten battery cells 200 in parallel.

At least one of the cell spaces S of the battery pack 10 may be the empty cell space 150 in which the battery cells 200 are not accommodated. In this regard, at least one of the cell spaces S surrounded by other cell spaces may be the empty cell space 150.

The empty cell spaces 150 are surrounded by other cell spaces as shown in FIG. 5, thereby achieving an air flow between the battery cells 200 accommodated in the empty cell spaces 150. Therefore, heat generated from the battery cells 200 may be efficiently dissipated.

The cell spaces S may be arranged in a first direction, for example, in the −y-axis direction, inside the holder case 100. The cell spaces S may be arranged in a second direction, for example, in the x-axis direction perpendicular to the first direction. That is, the cell spaces S may be arranged in a column direction along the −y-axis and in a row direction along the x-axis.

The battery pack 10 may further include a plurality of first groups 210 of the cell spaces S and a second group 220 of the cell spaces S in which the battery cells 200 are arranged in columns and rows. Each of the first groups 210 may include the cell spaces S arranged in N columns in the −y-axis direction and in N rows in the x-axis direction.

The second group 220 may include the cell spaces S arranged in M columns in the −y-axis direction and in N rows in the x-axis direction. In this case, the battery cells 200 may be accommodated in all the cell spaces S of the second group 220. M and N are natural numbers.

The cell spaces S of at least one of the first groups 210 may be arranged in the −y-axis direction. Further, the cell spaces S of the second group 220 may be consecutively arranged in the −y-axis direction from the last first group 210 of the first groups 210 that are arranged in the −y-axis direction.

The empty cell spaces 150 may be at least one of the cell spaces S of the first groups 210, excluding the cell spaces S disposed between a $1^{st}$ row and an $N^{th}$ row of an $N^{th}$ column.

The empty cell spaces 150 may be the cell spaces S of the first groups 210, excluding the cell spaces S disposed between the $1^{st}$ row and an $N^{th}$ row of the $N^{th}$ column. In this case, the empty cell spaces 150 may be all the cells spaces S disposed in a specific column.

Therefore, the empty cell spaces 150 may be selected from among the cell spaces S surrounded by other cell spaces. Thus, the air flow may be achieved between the battery cells 200 accommodated in the cell spaces 150. Further, heat generated from the battery cells 200 may be efficiently dissipated.

M may be 2 and N may be 4 in the 10S5P battery pack 10. In this case, the first groups 210 may include the 4×4 cell spaces S of which two cell spaces in the $4^{th}$ column cell spaces may be the empty cell spaces 150.

In the present embodiment, all the cell spaces 150 may encompass the circumference of the battery cells 200 in such a way that the battery cells 200 may be accommodated in the cell spaces 150. However, although the empty cell spaces 150 may have the same shape as the cell spaces S in which the battery cells 200 are accommodated, the battery cells 200 are not accommodated in the empty cell spaces 150.

Meanwhile, according to another embodiment, an empty cell space may be disposed in portions of two or more neighboring cell spaces. That is, the cell space S disposed between a $2^{nd}$ row and an $N-1^{th}$ row of the $N^{th}$ column may be the empty cell space. In the present embodiment, the empty cell space may be disposed between a $2^{nd}$ row and a $3^{rd}$ row of a $4^{th}$ column. In this case, the empty cell space may have a shape different from the cell spaces S in which the battery cells 200 are accommodated.

Therefore, the empty cell space 150 may be greater than the cell spaces S in which the battery cells 200 are accommodated, thereby improving the heat dissipation efficiency. Thus, the battery capacity performance, i.e. the battery lifetime, may be increased with respect to repetitive charge/discharge operations compared to empty cell spaces formed in a single whole column. Furthermore, the spatial efficiency of the battery pack 10 may be improved by efficiently utilizing the inner space thereof.

Figure 6:
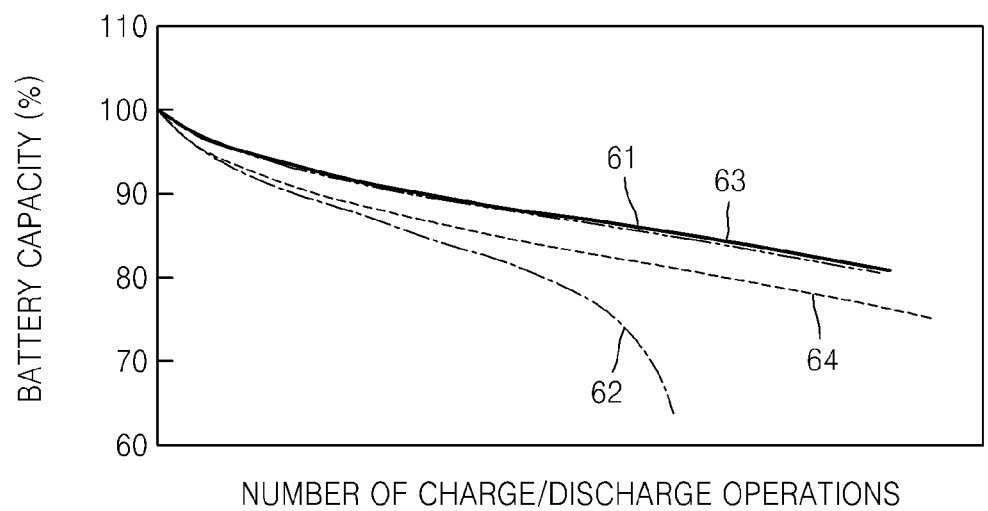
FIG. 6 is a graph of variations in battery performance of the battery pack of FIG. 1 in view of the battery capacity with respect to the number of charge/discharge operations, according to an embodiment of the present invention.

FIG. 6 is a graph of variations in battery performance of the battery pack 10 in view of the battery capacity with respect to the number of charge/discharge operations, according to an embodiment of the present invention.

Referring to FIG. 6, a curve 61 shows the battery performance of the battery pack 10 including the empty spaces 150 in which the battery cells 200 are not accommodated. As a comparative example, a curve 62 shows the battery performance of the battery pack 10 including the same number of battery cells 200 as shown in FIG. 1 and excluding the empty spaces 150 in which the battery cells 200 are not accommodated. In this regard, the curves 61 and 62 indicate variations of the battery capacity with respect to the number of charge/discharge operations performed at a temperature of 25° C.

The curve 61 has a similar pattern to a curve 63 of the battery performance of a 1S5P battery pack including five battery cells connected in parallel and one battery cell in series while the charge/discharge operations are performed at the temperature of 25° C.

The curve 62 has a similar pattern to a curve 64 of the battery performance of the 1S5P battery pack while the charge/discharge operations are performed at a temperature of 45° C. at an initial stage. However, the curve 62 shows a rapid decrease in battery capacity according to an increase in the charge/discharge operations.

In more detail, the curve 61 of the battery performance of the battery pack 10 shows an improved lifetime performance compared to the curve 62 of the battery performance of the battery pack 10. Therefore, the battery pack 10 according to an aspect of the present invention may increase the battery lifetime.

The battery pack 10 shown in FIG. 1 may include the empty cell spaces 150, thereby improving heat dissipation efficiency. Thus, the battery capacity property, i.e., the battery lifetime, may be improved with respect to repetitive charge/discharge operations.

According to an aspect of the present invention, a battery pack including a plurality of battery cells may increase the battery lifetime.

It should be understood that the exemplary embodiments described herein should be considered in a descriptive sense only and not for purposes of limitation. Descriptions of features or aspects within each embodiment should typically be considered as available for other similar features or aspects in other embodiments. Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery pack comprising:
   a plurality of battery cells having an outer contour; and
   a holder case defining a plurality of cell spaces that are contoured to match the outer contour of the plurality of battery cells and are sized to receive the plurality of battery cells to accommodate the plurality of battery cells wherein the holder case comprises a first and a second case that jointly define the plurality of cell spaces wherein the first and second cases have an open configuration where the interior of the cell spaces are exposed and a closed configuration wherein the first and second holder cases are coupled together to inhibit access to the plurality of cell spaces,
   wherein at least one of the plurality of cell spaces does not accommodate at least one battery cell when the first and second case are in the closed configuration and wherein the plurality of battery cells are not accommodated in at least one of the plurality of cell spaces entirely surrounded by other cell spaces, a plurality of first groups of cell spaces, each group comprising the plurality of cell spaces arranged in N columns in the first direction and in N rows in the second direction, wherein at least one of the plurality of cell spaces is an empty cell space, and is formed between a $1^{st}$ row and an $N^{th}$ row of an $N^{th}$ column, where N is a natural number.

2. A battery pack comprising:

a plurality of battery cells having an outer contour; and a holder case including first and second holder cases facing each other forming a plurality of cell spaces therebetween wherein the plurality of cell spaces are contoured to match the outer contour of the plurality of battery cells and the plurality of battery cells are sized to accommodate the plurality of battery cells wherein the holder case comprises a first and a second case that jointly define the plurality of cell spaces wherein the first and second cases have an open configuration where the interior of the cell spaces are exposed and a closed configuration wherein the first and second holder cases are coupled together to inhibit access to the plurality of cell spaces, wherein a portion of the plurality of cell spaces do not accommodate a portion of the plurality of battery cells when the holder space is in the closed configuration and wherein the plurality of battery cells are not accommodated in at least one of the plurality of cell spaces entirely surrounded by other cell spaces, a plurality of first groups of cell spaces, each group comprising the plurality of cell spaces arranged in N columns in the first direction and in N rows in the second direction, wherein at least one of the plurality of cell spaces is an empty cell space and is formed between a $1^{st}$ row and an $N^{th}$ row of an $N^{th}$ column, where N is a natural number.

3. The battery pack of claim 2, wherein each of the first and second holder cases comprises:

a plurality of ribs disposed inside and separating the plurality of battery cells; and a holder frame encompassing lateral surfaces of the plurality of ribs, being integrally formed with the plurality of ribs, and forming an outline of the holder case.

4. The battery pack of claim 3, wherein each of the plurality of ribs comprises: first and second fins to separate the plurality of battery cells, and a column disposed in a portion where the first fin and the second fin cross each other.

5. The battery pack of claim 4, further comprising a heat dissipation hole formed along the column along a lengthwise direction, where air flows through the heat dissipation hole.

6. A battery pack comprising:

a holder case defining a plurality of cell spaces wherein the holder case comprises a first and a second cases that jointly define the plurality of cell spaces wherein the first and second cases have an open configuration where the interior of the cell spaces are exposed and a closed configuration wherein the first and second holder cases are coupled together to inhibit access to the plurality of cell spaces; and a plurality of battery cells having an outer contour accommodated in the plurality of cell spaces, respectively wherein each of the plurality of cell spaces are contoured to match the outer contours of the battery cells and are sized to receive the battery cells, wherein the plurality of battery cells are accommodated in a pattern in the plurality of cell spaces such that at least one of the plurality of cell spaces is empty when the first and second holder cases are in the closed configuration wherein the plurality of battery cells are not accommodated in at least one of the plurality of cell spaces entirely surrounded by other cell spaces, wherein the plurality of battery-cells comprise a plurality of first groups of cell spaces, each group comprising the plurality of cell spaces arranged in N columns in the first direction and in N rows in the second direction, wherein at least one of the plurality of cell spaces is an empty cell space, and is formed between a $1^{st}$ row and an $N^{th}$ row of an $N^{th}$ column, where N is a natural number.

7. The battery pack of claim 6, wherein the plurality of cell spaces are arranged in a first direction inside the holder case, and arranged in a second direction that is different from the first direction.

8. The battery pack of claim 7, wherein the second direction is substantially perpendicular to the first direction.

9. The battery pack of claim 6, wherein the empty cell space is formed between two or more neighboring cell spaces.

10. The battery pack of claim 6, wherein at least one of the plurality of first groups is arranged in the first direction.

11. The battery pack of claim 6, further comprising: a second group comprising the plurality of cell spaces arranged in M columns in the first direction and in N rows in the second direction, wherein the plurality of battery cells is accommodated in all the cell spaces of the second group.

12. The battery pack of claim 11, wherein at least one of the plurality of first groups are consecutively arranged in the first direction, and at least one of the second group is consecutively arranged in the first direction from the last first group.

13. The battery pack of claim 6, wherein all the cell spaces are empty cell spaces, excluding the cell spaces formed between a $1^{st}$ row and an $N^{th}$ row of an $N^{th}$ column of each of the first groups.

14. The battery pack of claim 6, wherein the empty cell spaces have different shapes from the plurality of cell spaces in which the plurality of battery cells are accommodated.

15. The battery pack of claim 6, wherein the holder case comprises: a first holder case and a second holder case facing each other, wherein the plurality of cell spaces are formed between the first holder case and the second holder case.

16. The battery pack of claim 15, wherein the holder case comprises:

a plurality of ribs disposed inside the first holder case and the second holder case and separating the plurality of battery cells; and a holder frame encompassing the lateral surfaces of the plurality of ribs, being integrally formed with the plurality of ribs, and forming the outline of the holder case.

17. The battery pack of claim 15, wherein the plurality of cell spaces are in a form of holes that are disposed inside the holder case.

18. The battery pack of claim 15, wherein the plurality of cell spaces are arranged in a first direction inside the holder case, and arranged in a second direction different from the first direction, wherein each of the plurality of ribs comprises: a first fin extending in the second direction in order to separate the plurality of neighboring battery cells, a second fin extending in the second direction opposite to the first direction in order to separate the plurality of neighboring battery cells, and a column disposed in a portion where the first fin and the second fin cross each other.

19. The battery pack of claim 18, further comprising: a heat dissipation hole formed along the column in a lengthwise direction of the column, wherein air flow is formed through the heat dissipation hole.

\* \* \* \* \*